(12) United States Patent
Zuzarte et al.

(10) Patent No.: US 8,812,481 B2
(45) Date of Patent: Aug. 19, 2014

(54) MANAGEMENT OF INTERESTING DATABASE STATISTICS

(75) Inventors: Calisto Paul Zuzarte, Pickering (CA); Volker Gerhard Markl, San Jose, CA (US); Wing Yan Lau, Toronto (CA); Ihab Ilyas, Waterloo (CA); Amr El-Helw, Waterloo (CA)

(73) Assignee: International Business Machines Corporation, Armonk, NY (US)

( * ) Notice: Subject to any disclaimer, the term of this patent is extended or adjusted under 35 U.S.C. 154(b) by 378 days.

(21) Appl. No.: 11/777,255

(22) Filed: Jul. 12, 2007

(65) Prior Publication Data

US 2009/0018992 A1 Jan. 15, 2009

(51) Int. Cl.
*G06F 17/30* (2006.01)
*G06F 7/00* (2006.01)

(52) U.S. Cl.
CPC .............. *G06F 17/30463* (2013.01)
USPC ............. 707/713; 707/718; 707/719

(58) Field of Classification Search
CPC ............ G06F 17/30306; G06F 17/30463; G06F 17/30474; G06F 17/30536; G06F 17/30469
See application file for complete search history.

(56) References Cited

U.S. PATENT DOCUMENTS

| | | | |
|---|---|---|---|
| 6,363,371 B1 | 3/2002 | Chaudhuri et al. | |
| 6,529,901 B1 * | 3/2003 | Chaudhuri et al. | 1/1 |
| 2003/0115183 A1 | 6/2003 | Abdo et al. | |
| 2005/0119999 A1 * | 6/2005 | Zait et al. | 707/3 |
| 2005/0120000 A1 * | 6/2005 | Ziauddin et al. | 707/3 |
| 2005/0125452 A1 * | 6/2005 | Ziauddin et al. | 707/104.1 |
| 2005/0138015 A1 * | 6/2005 | Dageville et al. | 707/3 |
| 2006/0230016 A1 | 10/2006 | Cunningham et al. | |
| 2008/0256025 A1 * | 10/2008 | Bestgen et al. | 707/2 |

OTHER PUBLICATIONS

Author: Mayur Datar, Aristides Gionis, Piotr Indyk, Rajeev Motwani; Title: "Maintaining Stream Statistics over Sliding Windows"; Date:Oct. 18, 2002; Publisher: Society for Industrial and Applied Mathematics; Pertinent pp. 1-20 (re-numbered) as attached pdf.*
Author: V. Markl, N. Megiddo, M. Kutsch, T.M. Tran, P. Haas, U. Srivastava; Title: "Consistently Estimating the Selectivity of Conjuncts of Predicates"; Date: 2005; Publisher: VLDB Conference; Pertinent pp. 1-12 (re-numbered) as attached pdf.*
A. Aboulnaga, et al., "Automated Statistics Collection in DB2 UDB", Proceedings of the 30th VLDB Conference, 2004, 12 Pages.
Shivanth Babu, et al., "Proactive Re-Optimization", ACM SIGMOD, Jun. 2005, pp. 107-118.
A. El-Helw, et al., "Collectin and Maintaining Just-in-Time Statistics" IEEE 23rd International Conference on Data Engineering, Jul. 20, 2001. 9 Pages.
Laura M. Haas, et al., "Extensible Query Processing in Starburst", ACM SIGMOD, 1989, pp. 377-388.
Ihab F. Ilyas, et al., "CORDS: Automatic Discovery of Correlations and Soft Functional Dependencies", ACM SIGMOD, 2004, pp. 647-658.

(Continued)

*Primary Examiner* — Anh Tai Tran
(74) *Attorney, Agent, or Firm* — Sawyer Law Group, P.C.

(57) ABSTRACT

A method, system, and computer program product for managing database statistics are provided. The method, system, and computer program product provide for receiving a query for optimizing, collecting statistics specific to the query prior to generating any access plans for executing the query, and generating an access plan for executing the query based on the collected statistics.

15 Claims, 7 Drawing Sheets

(56) References Cited

OTHER PUBLICATIONS

Navin Kabra, et al., "Efficient Mid-Query Re-Optimization of Sub-Optimal Query Execution Plans", ACM SIGMOD, 1998, pp. 106-117.

Volker Markl, et al., "Consistently estimating the Selectivity of Conjuncts of Predicates", Proceedings of the 31st VLDB Conference, 2005, pp. 373-384.

Volker Markl, et al., "Robust Query Processing through Progressive Optimization", ACM SIGMOD, 2004, pp. 659-670.

Viswanath Poosala, et al., "Improved Histograms for Selectivity Estimation of Range Predicates", ACM SIGMOD, pp. 294-305.

U. Srivastava, et al., ISOMER: "Consistent Histogram Construction Using Query Feedback", 22nd ICDE Conference, 2006, 12 Pages.

Michael Stillger, et al., "LEO—DB2's LEarning Optimizer, http://www.dia.uniroma3.it/~vldbproc/006_019.pdf," Proceedings of the 27th VLDB Conference, 2001, pp. 19-28.

Xiaohui Yu, et al., "HASE: A Hybrid Approach to Selectivity Estimation for Conjunctive Predicates", 10th EDBT Conference, 2006, pp. 460-477.

Xiaohui Yu, et al., "Towards Estimating the Number of Distinct Value Combinations for a Set of Attributes", ACM 14th CIKM Conference, 2005, pp. 656-663.

S. Chaudhuri, et al., "Automating Statistics Management for Query Optimizers" IEEE Transactions on Knowledge and Data Engineering, Jan./Feb. 2001, pp. 7-20, vol. 13 n1.

\* cited by examiner

| table | group | hst | count | factor |
|---|---|---|---|---|
| T1 | (a,b,c) | {(a,b),(c)} | 5 | 0.4 |
| T1 | (a,b,c) | {(a),(b,c)} | 2 | 0.7 |
| T1 | (a,b,c) | {(a,b,c)} | 10 | 0.98 |
| T1 | (a,b,d) | {(a,b),(d)} | 4 | 0.8 |

*FIG. 6*

MANAGEMENT OF INTERESTING DATABASE STATISTICS

FIELD OF THE INVENTION

The present invention relates generally to management of interesting database statistics.

BACKGROUND OF THE INVENTION

Database systems rely on statistics (e.g., number of rows in a table, number of distinct values in a column, and the like) to optimize queries (e.g., generate and select optimal access plans for executing queries). When statistics are missing or sale stale, less than optimal plans may be generated and selected.

Various approaches have been proposed to address the problem of missing or stale statistics and the effect on query optimization. Existing approaches, however, oftentimes only benefit future queries and do not benefit currently executing queries. In addition, approaches that can be used to benefit currently executing queries usually involve multiple optimization attempts (e.g., multiple calls to an optimizer), which is inefficient and expensive.

SUMMARY OF THE INVENTION

A method, system, and computer program product for managing database statistics that are interesting to queries received for optimizing are provided. The method, system, and computer program product provide for receiving a query for optimizing, collecting statistics specific to the query prior to generating any access plans for executing the query, generating an access plan for executing the query based on the collected statistics, and storing one or more of the collected statistics in an archive.

BRIEF DESCRIPTION OF THE DRAWINGS

FIG. 6 shows a sample table storing predicate group history according to an implementation of the invention.

DETAILED DESCRIPTION

The present invention generally relates to managing database statistics. The following description is presented to enable one of ordinary skill in the art to make and use the invention and is provided in the context of a patent application and its requirements. The present invention is not intended to be limited to the implementations shown, but is to be accorded the widest scope consistent with the principles and features described herein.

Statistics, such as number of rows in a table, number of distinct values in a column, most frequent values in a column, distribution of data values, and the like, are used by database systems to generate and select optimal (e.g., fastest, least costly, and so forth) access plans for executing queries (e.g., database statements requesting retrieval, insertion, update, deletion, and so forth of data in a database). Database systems use statistics to estimate, for instance, cardinality (e.g., number of rows to be processed) at each intermediate step of an access plan, which leads to an estimate of an overall cost of the access plan.

If access plans are generated/selected based on, for instance, stale (e.g., outdated) or inaccurate statistics, then suboptimal access plans may be generated/selected due to errors in cost estimation. Suboptimal access plans could lead to unacceptably long query processing time. Statistics may become inaccurate or stale as a result of changes that are made to the underlying data after the statistics are collected.

Different techniques are available for tackling the problem of missing or stale statistics and the effect on query optimization. These techniques, however, typically only benefit future queries and not a current query because new statistics are not collected until the current query is executed. In other words, new statistics are not collected until after the current query has already been optimized (e.g., an access plan has been generated and selected).

Some existing techniques can be used to benefit a current query. However, these techniques usually involve repeated calls to an optimizer and may even involve optimizing or executing a portion of the query multiple times. This is both inefficient and expensive. Other approaches maintain multiple pre-selected query plans and use run-time statistics to choose among them. This can be expensive in terms of memory used to store multiple plans and only a limited number of plan choices can be kept.

Figure 1:
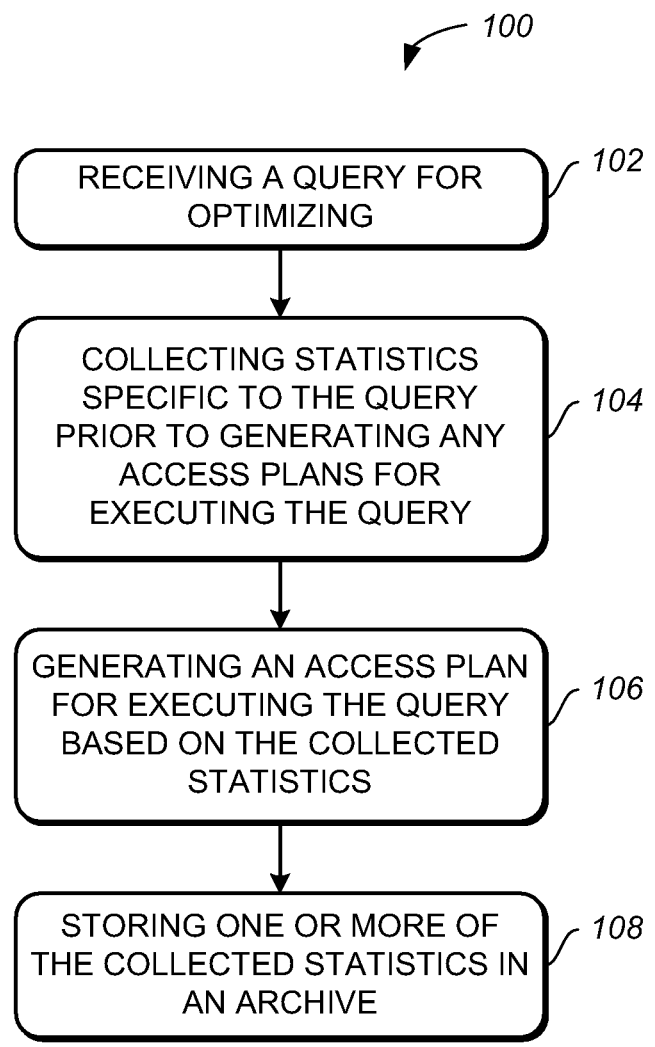
FIG. 1 depicts a process for managing database statistics according to an implementation of the invention.

FIG. 1 depicts a process 100 for managing (e.g., collecting, using, storing, and so forth) database statistics according to an implementation of the invention. At 102, a query is received for optimizing. The query may be a static query or a dynamic query. At 104, statistics specific to the query are collected prior to generating any access plans for executing the query. Hence, statistics relevant to a current query are collected just in time for use in optimizing the current query. At 106, an access plan for executing the query is generated based on the collected statistics. One or more of the collected statistics are then stored in an archive at 108. Although not shown in FIG. 1, process 100 may include other process blocks, such as executing the query in accordance with the access plan generated.

Figure 2:
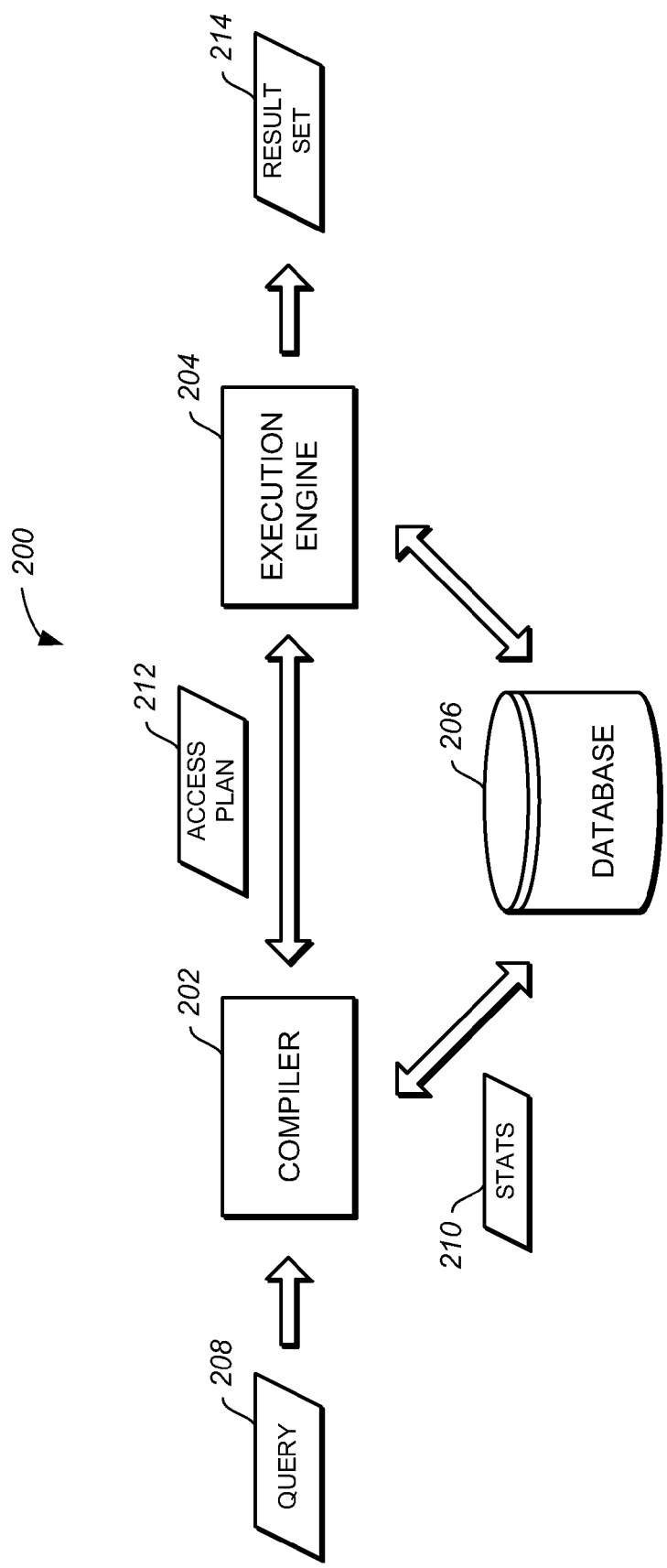
FIG. 2 illustrates a system for managing database statistics according to an implementation of the invention.

Illustrated in FIG. 2 is a system 200 for managing database statistics according to an implementation of the invention. System 200 includes a compiler 202 and an execution engine 204, which are in communication with one another. Both compiler 202 and execution engine 204 have access to a database 206. Compiler 202 and execution engine 204 may be part of a larger component (not shown) of system 200, such as a database management system. The DB2® Universal Database™ product from International Business Machines Corp. of Armonk, N.Y. is an example of a database management system.

Although not illustrated in FIG. 2, system 200 may include additional components (e.g., database administration modules). In addition, components in system 200 may be remotely located from one another. Each component of system 200 may also include sub-components that are not shown. For example, compiler 202 may include sub-components, such as a parser, an optimizer, and the like.

In the implementation of FIG. 2, a query 208 is received by compiler 202 for processing. Query 208 may have originated from a client (not shown), such as an online analytical processing (OLAP) application, which may be remotely located from system 200. In one implementation, query 208 is a complex query, such as a query that includes a large number of joined tables, aggregate functions, and/or predicates. Typically, with complex queries, there are potentially more access plans that can be generated and selected. Before compiler generates any access plans for executing query 208, compiler 202 collects statistics 210 from database 206 that are specific to query 208.

For instance, compiler 202 may collect statistics on particular tables involved in query 208, such as number of rows in a table, distribution of data values, and the like. In addition, statistics on specific columns targeted by predicates of query 208 may be collected, such as number of distinct values in a column, most frequent values in a column, and the like Based on statistics 210 collected, compiler 202 generates an access plan 212 for executing query 208. Access plan 212 is communicated from compiler 202 to execution engine 204. Execution engine 204 then executes query 208 in accordance with access plan 212 generated by compiler 202. A result set 214 is retrieved from database 206. Result set 214 may then be returned to, for instance, a client that submitted query 208, displayed to a user (not shown), or something similar.

Figure 3:
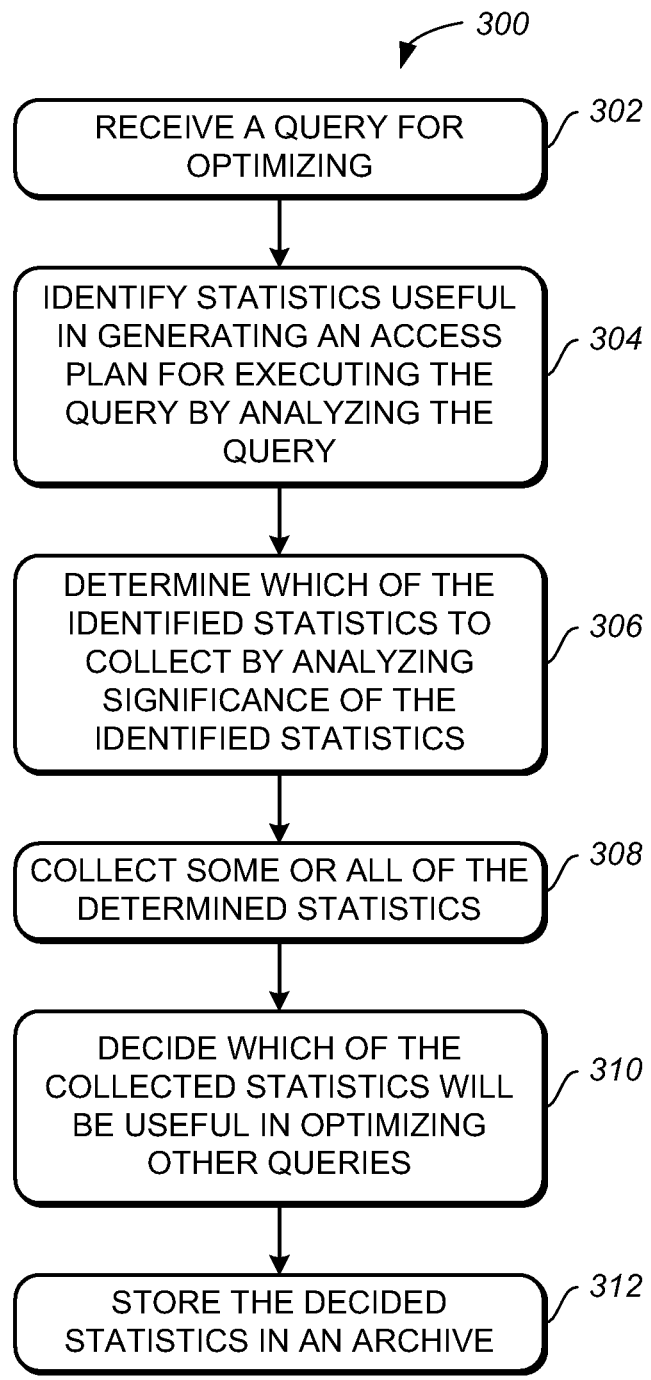
FIG. 3 shows a process for managing database statistics according to an implementation of the invention.

FIG. 3 shows a process 300 for managing database statistics according to an implementation of the invention. At 302, a query is received for optimizing. In one implementation, the query is from an on-line transaction processing (OLTP) application. In another implementation, the query is from an OLAP application.

At 304, statistics useful in generating an access plan for executing the query are identified by analyzing the query. For instance, if the query involves tables A, B, and C, and includes predicates on columns a1 and a2 of table A, column b0 of table B, and column c2 of table C, then statistics useful in generating an access plan for executing the query includes statistics on tables A, B, and C, and statistics on columns a1, a2, b0, and c2. This is more feasible than a brute-force approach of enumerating all possible statistics on every table of a database and every column in each table.

A determination is made at 306 as to which of the identified statistics to collect. The determination is made by analyzing significance of the identified statistics (e.g., how important a statistic is for generating an execution plan for the query, what are the chances that a statistic has changed dramatically since it was retrieved, and so forth). In one implementation, significance analysis of identified statistics includes analyzing sensitivity of the query to the identified statistics (e.g., how different an access plan generated with a particular statistic will be from an access plan generated without the particular statistic, how likely query performance will be negatively affected by the difference, and so forth).

Sensitivity analysis may take into account existence of one or more of statistics, history of data activity, structure of the query, nature of data, and the like. Nature of data may be referring to, for instance, when a particular column only includes unique values (e.g., a key column), when a table is ordered a particular way (e.g., in ascending alphabetical order), and the like.

At 308, some or all of the statistics determined at 306 as important, desirable, preferred, necessary, required, or the like, are collected. Collection of statistics may be accomplished by sampling data. In one implementation, data sampling is used only when the sample size will be greater than or equal to a predetermined size (e.g., 2000 pages). Less than all of the determined statistics may be collected because the costs associated with collecting all of the determined statistics may outweigh the benefits at a particular point in time.

In one implementation, a time budget (e.g., 5 second, 10 seconds, etc.) may be set for collecting query-specific statistics. If a time budget is set, then collection of query-specific statistics will cease once the time budget has been consumed. The time budget may be implemented to have a default setting. However, the time budget may also be implemented as configurable. When a time budget is used, the determined statistics may be ranked, for instance, in descending order of importance so that more important statistics are collected first before the time budget expires.

A decision is made at 310 as to which of the collected statistics will be useful in optimizing other queries. For instance, if some of the query-specific statistics are general enough, they may be useful in generating access plans for executing other queries. At 312, statistics decided at 310 as valuable, worthwhile, useful, and the like, are then stored in an archive. The archive may be a particular area of memory or a specific area on disk that is set aside specifically to store query-specific statistics.

By focusing on the query at hand, analyzing it to identify statistics relevant to the query, and collecting only those statistics that are important, but are stale, inaccurate, or not available, the problems associated with query optimization using outdated statistics are addressed in such a way that current queries are able to benefit without having to call an optimizer multiple times or to optimize a query more than once after executing a portion of the query. In addition, some of the statistics collected may be stored for use with other queries, which can further improve overall performance of a query workload.

Figure 4:
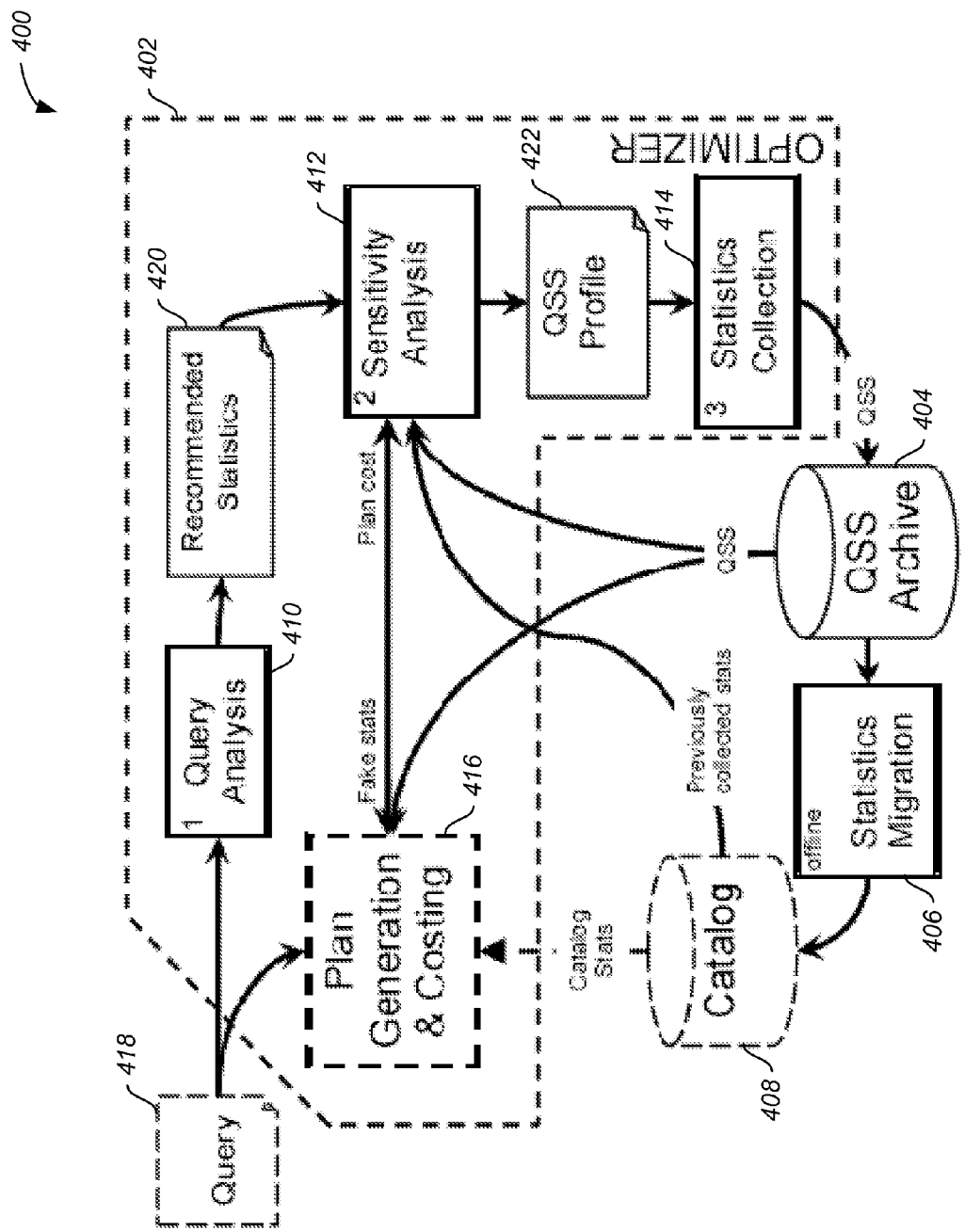
FIG. 4 depicts a system for managing database statistics according to an implementation of the invention.

Depicted in FIG. 4 is a system 400 for managing database statistics according to an implementation of the invention. System 400 includes an optimizer 402, a query specific statistics (QSS) archive 404, a statistics migration component 406, and a catalog 408. Several components have been integrated into optimizer 402, including a query analysis component 410, a sensitivity analysis component 412, and a statistics collection component 414. Optimizer 402 also includes a plan generation and costing component 416. Other components (e.g., execution engine, parser, and the like) may be included in system 400 even though they are not depicted in FIG. 4.

Although components 410-414 are depicted in FIG. 4 as being part of optimizer 402, any one of components 410-414 may be implemented external to optimizer 402. In addition, other components (not shown) may be included in optimizer 402, such as a query rewrite component, and the like. Furthermore, optimizer 402 itself may be a sub-component of a larger component in system 400, such as a compiler (not shown).

In the implementation, when a query 418 is received by optimizer 402, query analysis component 410 analyzes the structure of query 418 to determine what statistics are recommended (e.g., relevant) for optimizing query 418. Analysis of the query may occur before or after query 418 has been rewritten by a query rewrite component (not shown). Query analysis component 410 communicates recommend statistics 420 to sensitivity analysis component 412.

Sensitivity analysis component 412 then performs a lightweight sensitivity analysis on recommended statistics 420 identified by query analysis component 410. The sensitivity analysis decides which of the recommended statistics 420 to collect by, for instance, examining query 416, nature of underlying data, existing statistics stored in QSS archive 404 and/or catalog 408, history of data activity, and so forth. Sensitivity analysis component 412 may also work in conjunction with plan generation and costing component 416 to determine sensitivity of query 418 to a particular statistic in deciding which of the recommended statistic 420 to collect.

Recommended statistics 420 that sensitivity analysis component 412 decides should be collected are sent in a QSS profile 422 to collection component 414 for collection of those statistics. The collected statistics are then stored in QSS archive 404. In one implementation, the collected statistics are used to update statistics already stored in QSS archive 404. In another implementation, the collected statistics are merged with statistics already stored in QSS archive 404.

Statistics stored in QSS archive 404 may also be updated using query feedback information. In one implementation, QSS space usage is monitored and unused statistics are pruned in order to limit QSS space usage. Information in QSS archive 404 and catalog 408 are used by plan generation and costing component 416 to generate an access plan for query 418. Data in QSS archive 404 can be periodically used to update catalog 408 using statistics migration component 406. Although some of the information stored in QSS archive 404 may not be used to update catalog 408 as the information may be based solely on sampling. Various implementations of QSS archive 404, query analysis component 410, sensitivity analysis component 412, and statistics collection component 414 are set forth in detail below.

Query Specific Statistics Archive

In one implementation, QSS archive 404 stores single- and multi-dimensional histograms. These histograms may be created and incrementally updated with each query posed to system 400. For each histogram stored in QSS archive 404, a time stamp can be maintained with each bucket. The time stamp can then be used by sensitivity analysis component 412 to determine how fresh (e.g., up-to-date) a statistic is. This aids in the decision of whether to reuse existing statistics or to collect new ones.

As query-specific statistics are collected, storage space may become an issue, especially since a single column may be involved in multiple histograms, each of which can be arbitrarily large. To avoid this, a limit can be set on the size of query-specific statistics to maintain. In case the space set aside for storing query-specific statistics is full and more statistics need to be inserted, a least recently used policy can be applied to prune (e.g., delete, remove, etc.), for instance, histograms from QSS archive 404, provided that each histogram is associated with a time it was last used for optimization.

Single-dimensional histograms represent individual columns and multi-dimensional histograms represent groups of columns. Each bucket contains a number of tuples (e.g., rows) that fall within its boundaries. Each bucket may also be associated with a time stamp of the last update performed on the bucket.

Histograms stored in QSS archive 404 may be updated whenever new statistics become available. New statistics could be in the form of predicate groups and number of tuples that satisfy them. In one implementation, the update process is based on the maximum entropy principle. Using maximum entropy in this context means updating a histogram in such a way that satisfies the knowledge gained by new statistics without assuming any further knowledge of the data (e.g., assuming uniformity unless more information is known).

Figure 5:
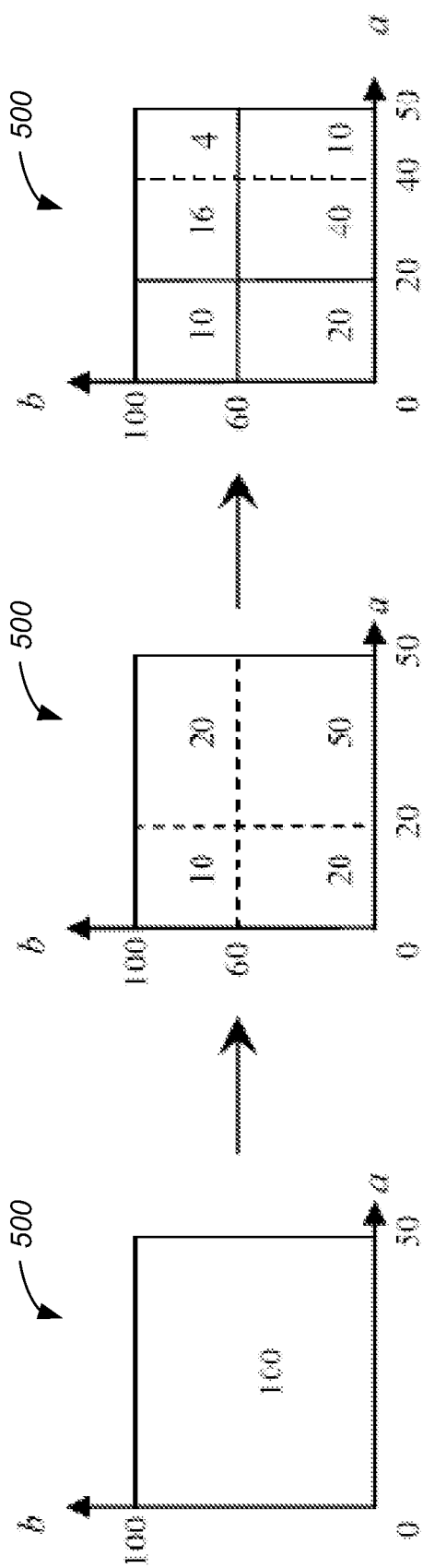
FIGS. 5A-5C illustrate various states of a sample 2-dimensional histogram according to an implementation of the invention.

FIGS. 5A-5C illustrate various states of a sample 2-dimensional histogram 500 on two attributes (e.g., columns) a and b. The values of attribute a range from 0 to 50 and the values of attribute b range from 0 to 100. As illustrated in FIG. 5A, the total number of tuples within the ranges of attributes a and b is 100. Initially histogram 500 includes just one bucket, as seen in FIG. 5A.

Consider a query with predicates a>20 and b>60. Assume that it is determined through sampling that 20 tuples satisfy this predicate group. In addition, assume that it is determined that the number of tuples that satisfy each of the two predicates individually is 70 and 30, respectively. Histogram 500 can then be updated using this new information, which is illustrated in FIG. 5B. In one implementation, each of the four resulting buckets receive a new timestamp.

Suppose another query is received that has a predicate a>40. Assume that there are 14 tuples which satisfy this predicate. Since no further information is known, uniformity within the buckets of the last histogram can be assumed. As a result, the newly inserted boundary splits the buckets as shown in FIG. 5C. Timestamps for the four new buckets (e.g., buckets on both sides of the dotted line) are updated in one implementation.

Query Analysis Component

In the implementation of FIG. 4, query analysis component 410 determines which statistics are relevant for a given query, regardless of whether or not the relevant statistics should be collected. Statistics can be classified as table statistics and column statistics. Table statistics, such as number of rows, number of pages, and so forth, are relevant for every table involved in a given query. Column statistics may include selectivities of predicates or groups of predicates in a given query.

Below is a sample algorithm of a procedure that can be used by query analysis component 410:

```
procedure QUERYANALYSIS(Q)
    P ← set of predicates in Q
    T ← set of tables involved in Q
    PG ← { }
    for all t ∈ T do
        P_t ← {p|p ∈ P, p is local on t}
        for i ← 1, |P_t| do
            G ← all i-predicate groups; predicates ∈ P_t
            for all g ∈ G do
                PG ← PG ∪ {g}
            end for
        end for
    end for
    return PG
end procedure
```

In the sample algorithm above, a query Q is taken as input and a set PG of candidate predicate groups on which statistics are relevant to optimization of query Q is returned. Each element in PG is a group of predicates that appear in the query. The sample algorithm analyzes query Q by examining its internal structure. All possible combinations of predicates belonging to each table involved in query Q is then enumerated.

For each table t, groups of i-predicates are considered, where i=1, 2, . . . , m (m is the number of local predicates on table t). Single predicates can be treated as predicate groups with one element. Consider the following query:

```
SELECT price FROM car
    WHERE make = 'Toyota' AND model = 'Corolla' AND year > 2000
```

Applying the sample algorithm above, the set $P_t$ will contain predicates make='Toyota', model='Corolla', and year>2000. A first iteration of the second for-loop will result in three groups with a single predicate in each. A second iteration of the second for-loop will result in three groups with two predicates in each. A last iteration of the second for-loop will result in one group with three predicates therein.

In the sample algorithm above, predicate groups are collected across a whole query (e.g., all predicates that belong to the same table in the query are treated as one $P_t$ set). Predicates, however, may be examined on query block level in another implementation. For example, if two predicates belong to the same table, but one of them is in a sub-query, while the other is in the main query, they may not be treated as a group because each query block may be processed separately.

Sensitivity Analysis Component

Statistics collection during query compilation may be expensive. Since collecting all statistics recommended by query analysis component 410 is not always necessary, it is beneficial to determine which statistics should be collected for a given query (e.g., important, necessary, and so forth). Below is a sample algorithm of a procedure that can be used by sensitivity analysis component 412:

```
procedure SENSITIVITYANALYSIS(Q, PG)
    T ← set of tables involved in Q
    for all t ∈ T do
        PG_t ← {g|g ∈ PG, g is local on t}
        if ShouldCollectStats(t, PG_t) then
            Mark t for statistics collection
            for all g ∈ PG_t do
                if ShouldMaterialize(g) then
                    Mark g for materialization
                end if
            end for
        end if
    end for
end procedure
```

In the sample algorithm above, the SENSITIVITYANALYSIS(Q, PG) procedure takes as input a query Q and a list of predicate groups recommended by, for instance, query analysis component 410. The sample algorithm for the SENSITIVITYANALYSIS (Q, PG) procedure utilizes two other procedures. The first procedure specified in the sample algorithm, which is called ShouldCollectStats(t, $PG_t$), determines whether a table t is important enough that statistics should be collected on it. In the implementation, the decision is made on a per table basis rather than a per predicate group basis because once a table is sampled, it is relatively cheap to collect selectivities of all predicate groups that belong to the table. All of the collected statistics can then be used to optimize a current query.

To meet potential space constraints, it may not always be useful to materialize (e.g., store) all statistics that are collected, especially if creation of new histograms is involved. For this reason, a second procedure, which is called ShouldMaterialize(g), is also included in the sample algorithm. The second procedure determines whether a certain predicate group selectivity should be materialized or not. Sample algorithms for the two procedures will be presented later on and discussed in detail.

Knowledge about predicate groups may be needed to effectively implement sensitivity analysis. Questions that may need to be answered include, for instance, are available statistics enough to estimate the selectivity of a predicate group or do additional statistics need to be collected? Also, if additional statistics are collected, would it be useful to materialize them or not? Hence, in one implementation, a history of all column groups encountered in previous queries is maintained. A single entry in this history table may be a tuple of the form (table, group, hst, count, factor), where:

table—table name to which a column group belongs
group—columns in the group (e.g., a, b, c)
hst—a set of histograms that can be used together to estimate the selectivity of the group, such as, {(a, b), (c)}; if another set of histograms is used for the same group, such as, {(a), (b, c)}, it will be inserted as a different entry
count—number of times that particular histograms have been used to compute selectivity of the group
factor—estimated selectivity divided by actual selectivity of the group The hst element is present because the selectivity of a predicate group can be estimated using the selectivities of individual predicates and/or some smaller groups. For instance, the selectivity of conjuncts of predicates such as $sel(p_1\hat{\ }p_2\hat{\ }p_3\hat{\ }p_4)$ can be estimated given partial selectivities such as $sel(p_1)$, $sel(p_2\hat{\ }p_3)$, and $sel(p_2\hat{\ }p_3\hat{\ }p_4)$, and so forth.

The factor can be calculated by monitoring query feedback and comparing observed selectivity to estimated selectivity. For instance, suppose the selectivity of a predicate group (a=5 AND b>10 AND c<100) is estimated to be 0.2 using a histogram on (a, b) and a histogram on c. However, during query execution, the actual selectivity observed is 0.5. The factor can then be calculated as 0.2/0.5=0.4. Entries with a factor closer to 1 produce a more accurate estimate than those with values closer to 0 or much higher than 1. The factor may be refined as more queries are executed.

Shown in FIG. 6 is a sample table 600 storing predicate group history according to an implementation of the invention. As shown in FIG. 6, only one table has been encountered thus far, i.e., table T1. In addition, there have been two distinct predicate groups, (a, b, c), and (a, b, d). Three histograms are available for predicate group (a, b, c), while only one histogram is available for predicate group (a, b, d). Each of the histograms has been used multiple times to estimate selectivity.

Important Tables

Deciding whether or not to collect statistics on a particular table is mainly based on answering two questions:

1. Are there enough existing statistics on the particular table? How accurate are the existing statistics?
2. How much has data changed since statistics were last collected on the particular table?

The answer to each question can be represented as a score ranging from 0 to 1, where 0 means that no statistics collection is needed and 1 meaning that statistics need to be collected. Below is a sample algorithm of a procedure that can be used to answer the above questions:

```
procedure SHOULDCOLLECTSTATS(t, PG)
    g ← group from PG with max # of predicates
    H ← {h|h ∈ history; h.table = t, h.group = g}
    MaxAcc ← 0
    for all h ∈ H do
        n ← no. of elements in h.hst
        accu ← h.factor
        for i ← 1, n do
            accu ← accu * certainty(h.hst[i], g)
        end for
        if accu > MaxAcc then
            MaxAcc ← accu
        end if
    end for
    s_1 ← (1 − MaxAcc)
    s_2 ← min(UDI(t) / cardinality(t), 1)
    score ← f(s_1, s_2)
```

-continued

```
    if score ≥ s_max then
        Return TRUE
    else
        Return FALSE
    end if
end procedure
```

In the sample algorithm for the SHOULDCOLLECTSTATS(t, PG) procedure, the predicate group that has the maximum number of predicates (e.g., the one with all predicates) is analyzed first. All history entries that refer to this group are fetched. For instance, if this group is (a=5 AND b>10 AND c<100), and the history is as shown in table 600 in FIG. 6, then H will have the first 3 entries. For each of these entries, the accuracy (accu) that would be obtained if the selectivity is estimated as in that entry is calculated.

The accuracy of an entry depends on the factor value in the entry, as well as the certainty in each histogram associated with the entry. Certainty of a histogram with respect to a predicate group is a number ranging from 0 to 1, which represents how accurately selectivity of the predicate group can be estimated based on the histogram.

Consider a 1-dimensional histogram on column a. A histogram has n buckets $B_1, B_2, \ldots, B_n$. Bucket $B_i$ lies between the boundaries of $b_{i-1}$ and $b_i$. Now consider a predicate a>value. If value≈$b_i$ for some i, then estimating the selectivity should be very accurate. As value becomes further away from any boundary, the accuracy decreases. This becomes even worse if value lies within a wide bucket.

In one implementation, to calculate the certainty on a single dimensional histogram, the following steps are followed:

Locate the bucket that contains value. Let this bucket be $B_j$ with boundaries $b_j-1$ and $b_j$.
Let $d_1$=value–$b_{j-1}$ and $d_2$=$b_j$–value
uncertainty=[min($d_1$, $d_2$)/max($d_1$, $d_2$)]*[($b_j$–$b_{j-1}$)/($b_n$–$b_0$)]
certainty=1–uncertainty From the above calculations, as bucket width increases, or as the value goes farther from bucket boundaries, the uncertainty increases. For multi-dimensional histograms, the overall certainty can be computed as the product of the certainty in each dimension.

Referring back to the sample algorithm for the SHOULDCOLLECTSTATS(t, PG) procedure, the maximum accuracy across entries (also a number in the range of 0 to 1) is the maximum accuracy that can be obtained using existing statistics. The score corresponding to the first question ($s_1$) can be calculated as 1—the maximum accuracy.

To answer the second question, a UDI counter of the table is examined. The UDI counter indicates a number of updates, deletions, and insertions that have taken place since the last statistics collection on the table. The second score ($s_2$) can be calculated as a ratio between the UDI counter and the table cardinality. Other implementations could include use of more granular counters of individual number of insertions, deletions and updates rather than a consolidated counter.

A total score of the table is computed as an objective function of the two individual scores. This function can be user-defined. One possible objective function is a weighted average of the individual scores. Another possible objective function is to simply average the two scores.

If the value of the total score exceeds a threshold $s_{max}$, the table is considered important, and statistics will need to be collected on it. As $s_{max}$ approaches 1, less statistics will be collected during compilation as total scores are unlikely to exceed the threshold. As $s_{max}$ decreases, statistics collection during compilation becomes more aggressive (e.g., more statistics will be collected) as total scores will more easily exceed the threshold.

Statistics to Materialize

As discussed above, once a table is sampled, the selectivities of all candidate predicate groups given by query analysis component 410 will be computed and used to optimize a given query. Thus, deciding which of these statistics to store in QSS archive 404 to be reused by future queries will be important. The decision can be based on how useful a particular statistic was for previous queries. Consequently, the decision will depend on (a) how many times the particular statistic has been used before and (b) how accurate the estimates computed using the particular statistic have been.

Below is a sample algorithm of a procedure that can be used to answer the above questions:

```
procedure SHOULDMATERIALIZE(g)
    if histogram exists on g then
        Return TRUE
    end if
    F = Σ_history freq
    H = {h|h ∈ history; g ∈ h.hst}
    score ← 0
    for all h ∈ H do
        score ← score + (h.factor * h.frequency / F)
    end for
    if score ≥ s_max then
        Return TRUE
    else
        Return FALSE
    end if
end procedure
```

The sample algorithm for the SHOULDMATERIALIZE(g) procedure lists all history entries that have the statistic in question as one of the hst elements. For example, if the statistic in question is the predicate group (a=5 AND b>10), and the history is as shown in table 600 of FIG. 6, then H will have the first and fourth entries. For each entry, its factor is multiplied by its normalized frequency and the results are added to form a score for the statistic in question. If this score exceeds a certain threshold, then it is considered useful and marked for materialization. Otherwise, the statistic will not be materialized.

The invention can take the form of an entirely hardware implementation, an entirely software implementation, or an implementation containing both hardware and software elements. In one aspect, the invention is implemented in software, which includes, but is not limited to, application software, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

Figure 7:
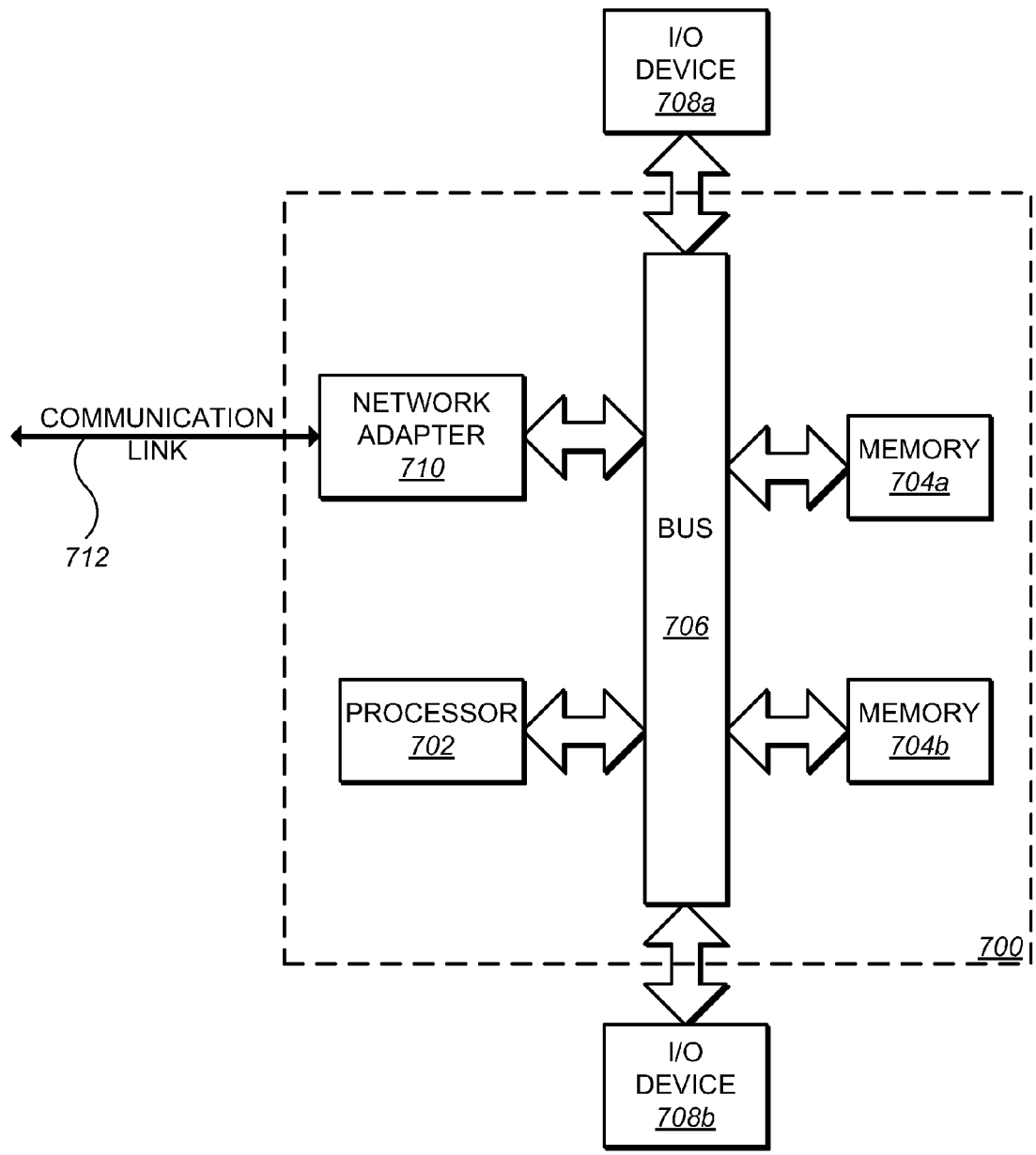
FIG. 7 depicts a block diagram of a data processing system with which implementations of the invention can be implemented.

FIG. 7 depicts a data processing system 700 suitable for storing and/or executing program code. Data processing system 700 includes a processor 702 coupled to memory elements 704a-b through a system bus 706. In other implementations, data processing system 700 may include more than one processor and each processor may be coupled directly or indirectly to one or more memory elements through a system bus.

Memory elements 704a-b can include local memory employed during actual execution of the program code, bulk storage, and cache memories that provide temporary storage of at least some program code in order to reduce the number of times the code must be retrieved from bulk storage during execution. As shown, input/output or I/O devices 708a-b (including, but not limited to, keyboards, displays, pointing devices, etc.) are coupled to data processing system 700. I/O devices 708a-b may be coupled to data processing system 700 directly or indirectly through intervening I/O controllers (not shown).

In the implementation, a network adapter 710 is coupled to data processing system 700 to enable data processing system 700 to become coupled to other data processing systems or remote printers or storage devices through communication link 712. Communication link 712 can be a private or public network. Modems, cable modems, and Ethernet cards are just a few of the currently available types of network adapters.

While various implementations for managing database statistics have been described, the technical scope of the present invention is not limited thereto. For example, the present invention is described in terms of particular systems having certain components and particular methods having certain steps in a certain order. One of ordinary skill in the art, however, will readily recognize that the methods described herein can, for instance, include additional steps and/or be in a different order, and that the systems described herein can, for instance, include additional or substitute components. Hence, various modifications or improvements can be added to the above implementations and those modifications or improvements fall within the technical scope of the present invention.

What is claimed is:

1. A method for managing database statistics, the method comprising:
    identifying statistics useful in generating access plans for executing a query;
    performing a sensitivity analysis on the identified statistics to determine which of the identified statistics to collect by calculating a total score for each table involved in the query and comparing the total score to a threshold, wherein the sensitivity analysis calculates the total score by determining whether there are a predetermined number of existing statistics in the table, an accuracy of the existing statistics in the table, a relevance of the existing statistics in an archive, and a change in data in the table since the existing statistics in the table were collected;
    collecting statistics based upon the performed sensitivity analysis;
    generating an access plan for executing the query based on the collected statistics; and
    storing one or more of the collected statistics in the archive.

2. The method of claim 1, wherein identifying statistics useful in generating access plans for executing the query further comprises:
    identifying, for each level of the query, predicate groups on which statistics will be useful in generating the access plan for executing the query,
    the identified predicate groups being all possible combinations of predicates belonging to each table involved in that level of the query.

3. The method of claim 1, wherein storing one or more of the collected statistics in the archive further comprises:
    deciding which of the collected statistics will be useful in generating an access plan for executing another query; and
    storing the decided statistics in the archive.

4. The method of claim 1, further comprising:
    setting a time budget for collecting the statistics; and
    ranking the statistics to collect the more important statistics first before the time budget is reached.

5. The method of claim 1, wherein previously stored statistics are merged and updated with the one or more collected statistics.

6. A system for managing database statistics, the system comprising:
    a database;
    a processor coupled to the database;
    a compiler unit coupled to the processor, the compiler unit:
        identifying statistics useful in generating access plans for executing a query;
        performing a sensitivity analysis on the identified statistics to determine which of the identified statistics to collect by calculating a total score for each table involved in the query and comparing the total score to a threshold, wherein the sensitivity analysis calculates the total score by determining whether there are a predetermined number of existing statistics in the table, an accuracy of the existing statistics in the table, a relevance of the existing statistics in an archive, and a change in data in the table since the existing statistics in the table were collected;
        collecting statistics based upon the performed sensitivity analysis;
        generating an access plan for executing the query based on the collected statistics; and
        storing one or more of the collected statistics in the archive; and
    an execution engine coupled to the processor and in communication with the compiler unit, the execution engine executing the query in accordance with the access plan generated by the compiler unit.

7. The system of claim 6, wherein the compiler unit identifies statistics useful in generating access plans for executing the query by:
    identifying, for each level of the query, predicate groups on which statistics will be used in generating the access plan for executing the query,
    the identified predicate groups being all possible combinations of predicates belonging to each table involved in that level of the query.

8. The system of claim 6, wherein the compiler unit stores the one or more collected statistics in the archive by:
    deciding which of the collected statistics will be useful in generating an access plan for executing another query; and
    storing the decided statistics in the archive.

9. The system of claim 6, wherein the compiler unit further performs the sensitivity analysis on the identified statistics by:
    setting a time budget for collecting the statistics; and ranking the statistics to collect the more important statistics first before the time budget is reached.

10. The system of claim 6, wherein previously stored statistics are merged and updated with the one or more collected statistics.

11. A computer program product comprising a non-transitory computer-readable storage medium, the non-transitory computer-readable storage medium having computer program logic recorded thereon for managing database statistics, wherein the computer program logic, when executed on a computer, causes the computer to:
   identify statistics useful in generating access plans for executing a query;
   performing a sensitivity analysis on the identified statistics to determine which of the identified statistics to collect by calculating a total score for each table involved in the query and comparing the total score to a threshold, wherein the sensitivity analysis calculates the total score by determining whether there are a predetermined number of existing statistics in the table, an accuracy of the existing statistics in the table, a relevance of the existing statistics in an archive, and a change in data in the table since the existing statistics in the table were collected;
   collect statistics based upon the performed sensitivity analysis;
   generate an access plan for executing the query based on the collected statistics; and
   store one or more of the collected statistics in the archive.

12. The computer program product of claim 11, wherein the computer program logic further causes the computer to:
   set a time budget for collecting the statistics; and
   rank the statistics to collect the more important statistics first before the time budget is reached.

13. The computer program product of claim 11, wherein statistics useful in generating access plans for executing the query are identified by:
   identifying, for each level of the query, predicate groups on which statistics will be used in generating the access plan for executing the query,
   the identified predicate groups being all possible combinations of predicates belonging to each table involved in that level of the query.

14. The computer program product of claim 11, wherein one or more of the collected statistics are stored in the archive by:
   deciding which of the collected statistics will be used in generating an access plan for executing another query; and
   storing the decided statistics in the archive.

15. The computer program product of claim 11, wherein previously stored statistics are merged and updated with the one or more collected statistics.

* * * * *